United States Patent [19]

Roschiwal et al.

[11] Patent Number: 4,575,288

[45] Date of Patent: Mar. 11, 1986

[54] METHOD OF AND APPARATUS FOR WORKING A PROFILED STEEL WORKPIECE

[76] Inventors: Helmut Roschiwal, Ulrichsmahd 16; Herbert Schmidt, Eichenstrasse 13, both of 8900 Augsburg; Karl Schink, Heidenstrasse 12, 5952 Attendorn-Dünschede, all of Fed. Rep. of Germany

[21] Appl. No.: 575,044

[22] Filed: Jan. 30, 1984

[30] Foreign Application Priority Data

Feb. 1, 1983 [DE] Fed. Rep. of Germany ....... 3303319

[51] Int. Cl.[4] .............................. B23B 39/14
[52] U.S. Cl. ..................... 408/1 R; 408/42; 408/46
[58] Field of Search ............. 29/26 A, 564, 33 S, 29/33 Q; 408/42, 43, 44, 31, 46, 32, 37, 55, 38, 39, 49, 70, 1

[56] References Cited

U.S. PATENT DOCUMENTS 3,253,484  5/1966  Hill ........................................ 408/38
3,548,686  12/1970 Marks .................................... 408/43
3,934,963  1/1976  Langlois ............................ 408/44 X
4,102,592  7/1978  Mackinder ........................... 408/46

FOREIGN PATENT DOCUMENTS 8008    1/1982  Japan ..................................... 408/46
889387 12/1981  U.S.S.R. ............................ 29/26 A Primary Examiner—William R. Briggs

[57] ABSTRACT

An apparatus for working a elongated angle-iron workpiece having a pair of nonparallel flanges at least one of which is to be drilled has a transport unit for displacing the workpiece longitudinally through a working station and a support in the station for holding the workpiece with the one flange forming an acute angle with the horizontal. A drilling unit including a drilling tool can move horizontally in the station transverse to the workpiece and transverse to the workpiece and at the acute angle to the horizontal perpendicularly through the one flange. To obtain a given displacement along the workpiece flange, the carriage supporting the drill unit is moved horizontally through a horizontal distance equal to the desired displacement times the secant of the angle that the flange forms with the horizontal. The drilling tool can be moved perpendicularly of the one flange during displacement of the carriage through the horizontal distance through a distance equal to the predetermined distance multiplied by the tangent of the acute angle the one flange forms with the horizontal so the drilling tool does not change spacing from the one flange during horizontal adjustment.

13 Claims, 5 Drawing Figures

METHOD OF AND APPARATUS FOR WORKING A PROFILED STEEL WORKPIECE

FIELD OF THE INVENTION

The present invention relates to a method of and apparatus for working a profiled steel workpiece. More particularly this invention concerns a method of and apparatus for drilling a flange of an angle iron.

BACKGROUND OF THE INVENTION

A standard apparatus for drilling the flanges of an angle iron has a transport unit for displacing the workpiece longitudinally through a working station, a support in the station for holding the workpiece with the one flange forming an acute angle with the horizontal, and a drilling unit having a drilling tool. This drilling tool is centered on and rotatable about an axis perpendicular to the flange to be drilled and can be moved axially to drill through the one flange.

It is of course necessary to set the edge-to-center distance, that is the distance between the center of the hole to be drilled and the workpiece edge, very accurately. In many systems in fact the drilling unit is retracted past the workpiece between drilling operations, so such predrilling positioning must be carried out before each drilling operation. Additionally, this distance or spacing not only varies from workpiece to workpiece, as typically the flange is drilled midway between its two edges, but it is also known to drill a staggered line of holes, so that the drilling unit must move laterally relative to the workpiece between successive drilling operations.

Thus it is standard to mount the drilling unit—including a drive motor, chuck, and drill bit—on a carriage that can move in a direction perpendicular to the flange to be drilled, and to mount this carriage in turn on another carriage that can move in a direction that is parallel to the flange to be drilled and that is also perpendicular to the workpiece travel and longitudinal directions. Such an arrangement presents considerable vibration and counterbalancing problems, especially as the drilling unit and the two carriages together are quite heavy. The device tends to wear unevenly, and when imbalanced poses considerably greater loads to the various drives than are necessary.

OBJECTS OF THE INVENTION

It is therefore an object of the present invention to provide an improved apparatus for working a flanged steel workpiece.

Another object is the provision of such an apparatus for working a flanged steel workpiece which overcomes the above-given disadvantages, that is which can, for instance, drill it at any location without overbalancing problems.

A further object is to provide an improved method of operating such an apparatus or drilling the workpiece.

SUMMARY OF THE INVENTION

An apparatus for working an elongated angle-iron workpiece having a pair of nonparallel flanges at least one of which is to be drilled according to the invention has a transport unit for displacing the workpiece longitudinally through a working station and a support in the station for holding the workpiece with the one flange forming an acute angle with the horizontal. A drilling unit including a drilling tool can move horizontally in the station transverse to the workpiece and transverse to the workpiece and at the acute angle to the horizontal perpendicularly through the one flange.

Since the rather large drilling carriage moves horizontally, it is stable in any position. Thus there are no counterbalancing problems so that the system can be counted on to have a much longer service life than could have been expected hitherto.

According to this invention to obtain a given displacement along the workpiece flange, the carriage supporting the drill unit is moved horizontally through a horizontal distance equal to the desired displacement times the secant of the angle that the flange forms with the horizontal. Since the carriage is typically positioned by an accurate electronically driven servomotor, it is relatively easy to employ a controller that automatically makes the appropriate trigonometric calculation for positioning the drilling tool before each drilling operation.

The drive unit according to this invention further includes a horizontal spindle operatively engaged with the carriage and a motor connected to the spindle. This motor is operated by the controller.

In accordance with another feature of the invention the first support includes a second drive unit for displacing the drilling tool perpendicularly of the one flange during displacement of the carriage through the horizontal distance in such manner that the drilling tool does not change spacing from the one flange during horizontal displacement of the carriage. In addition the second drive unit can move the drilling tool perpendicularly of the one flange during displacement of the carriage through the horizontal distance through a distance equal to the predetermined distance multiplied by the tangent of the acute angle the one flange forms with the horizontal. Thus the drilling tool does not change spacing from the one flange during horizontal adjustment, that is the tip of the drill bit stays the same distance from the workpiece. This feature is particularly useful in that it prevents the drill bit from traveling through the workpiece and damaging the support.

The second drive unit according to the invention includes a second carriage carrying the drilling tool and a second drive motor operatively connected thereto. This second drive unit can be independent of or interconnected with the first drive.

Thus the method according to this invention comprises the steps of holding the workpiece with the one flange forming an acute angle with the horizontal in a working station, displacing a drilling tool horizontally in the station transverse to the workpiece until the tool is aligned with the location on the flange to be drilled, and displacing the drilling tool perpendicularly of the workpiece through the one flange. According to another feature of the method of this invention, in order to move the drilling tool along the one flange through a predetermined distance, the tool is displaced through a horizontal distance equal to the predetermined distance multiplied by the reciprocal of the cosine of the acute angle the one flange forms with the horizontal.

The method further comprises the step of displacing the drilling tool perpendicularly of the one flange during displacement of the drilling tool through the horizontal distance in such manner that the drilling tool does not change spacing from the one flange during horizontal displacement of the carriage.

More particularly the drilling tool is displaced perpendicularly of the one flange during displacement of the carriage through the horizontal distance through a distance equal to the predetermined distance multiplied by the tangent of the acute angle the one flange forms with the horizontal. Thus the drilling tool does not change spacing from the one flange during horizontal adjustment.

DESCRIPTION OF THE DRAWING

The above and other features and advantages will become more readily apparent from the following, reference being made to the accompanying drawing in which.

SPECIFIC DESCRIPTION

Figure 1:
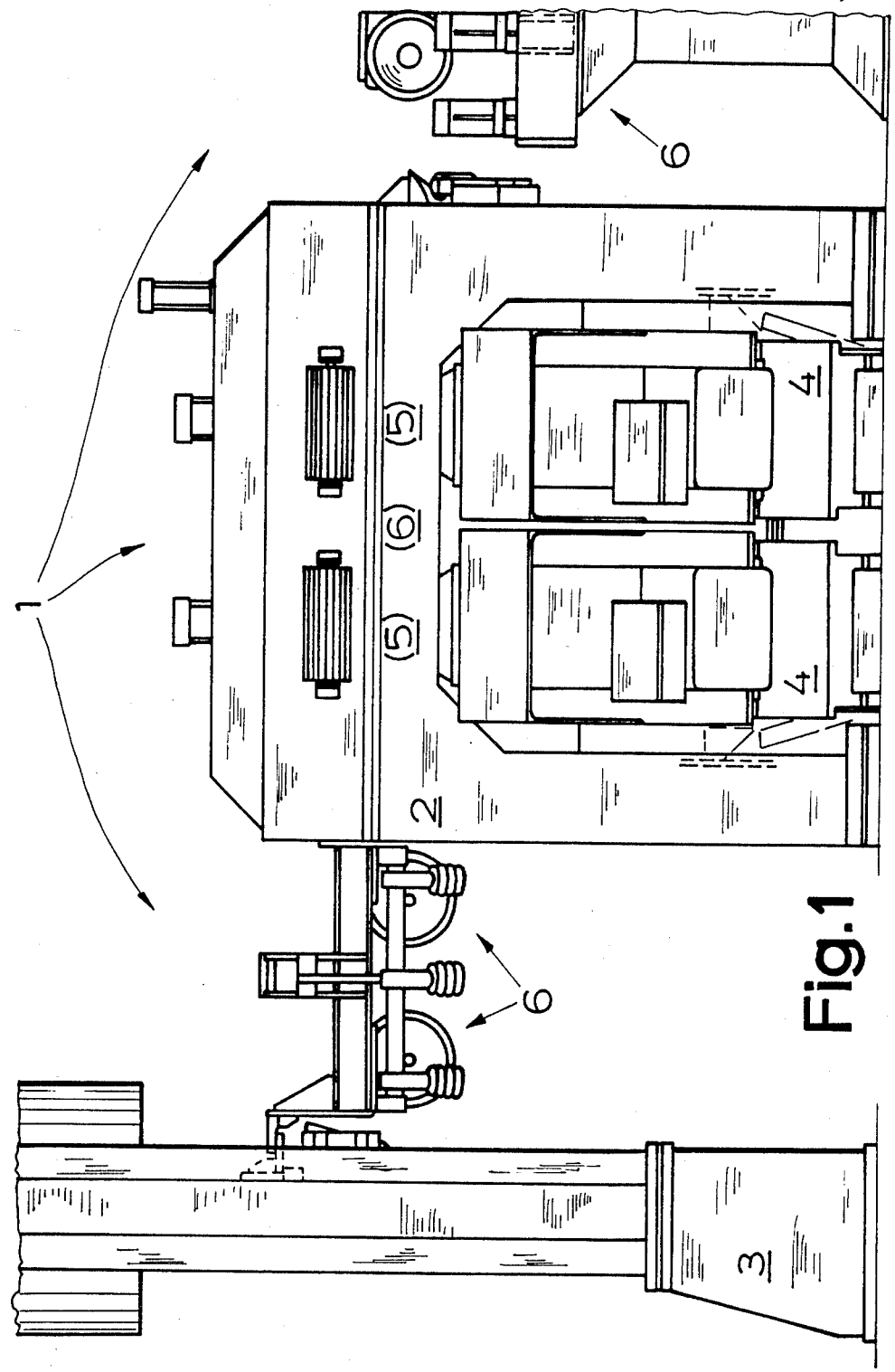
FIG. 1 is a side view of the apparatus according to the invention.
Figure 2:
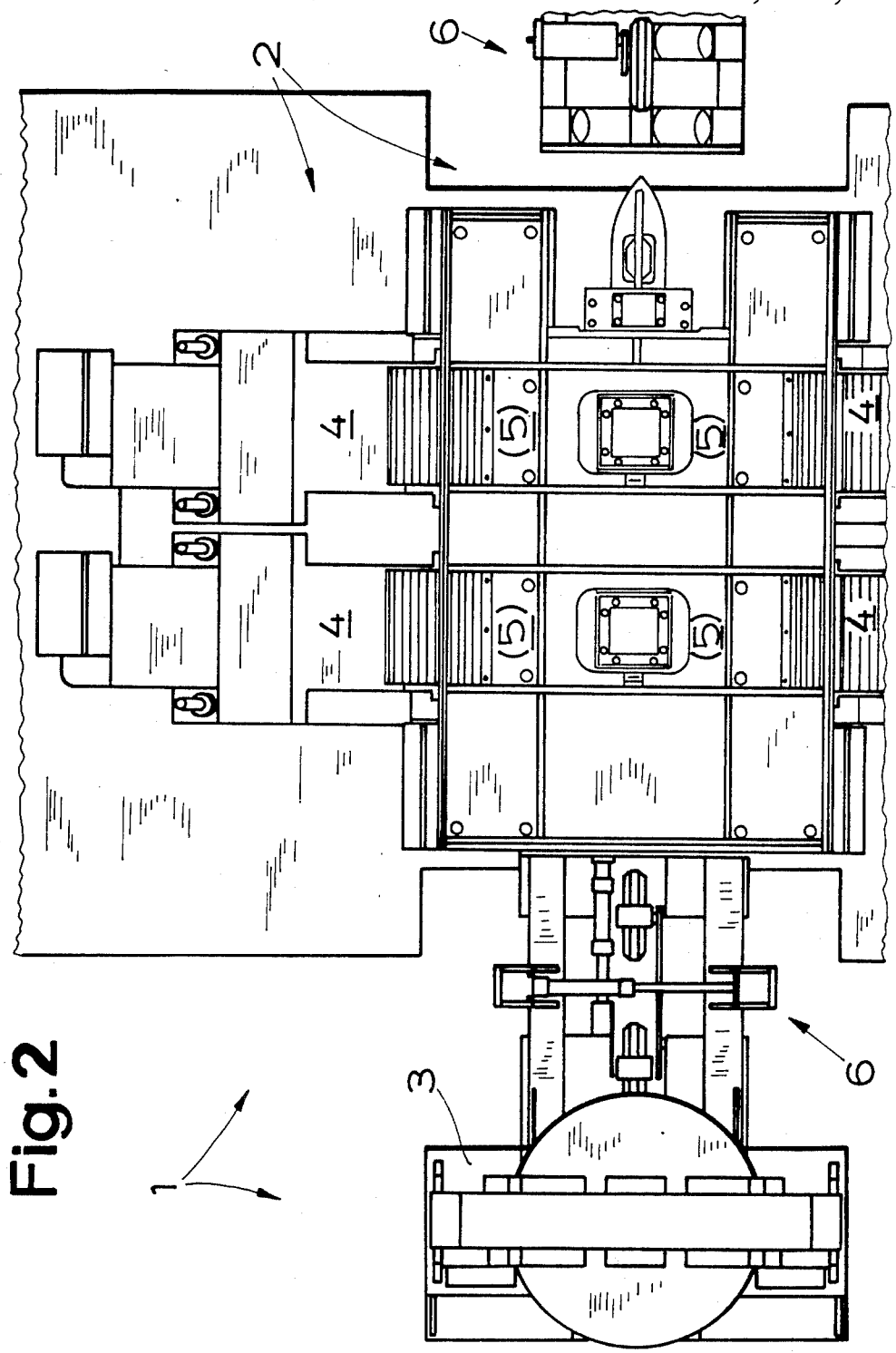
FIG. 2 is a top view of the apparatus of FIG. 1.
Figure 3:
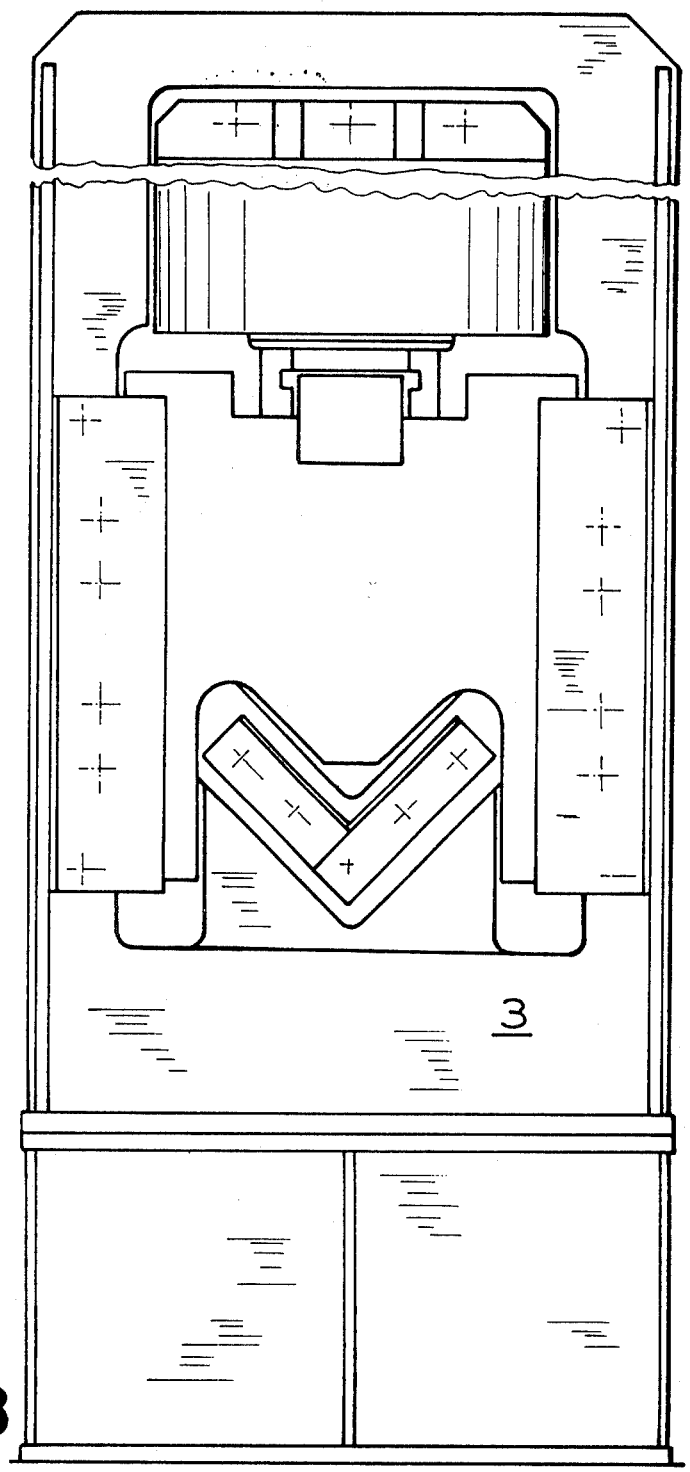
FIG. 3 is a large-scale end view taken in the direction of arrow III of the shear of FIG. 1.
Figure 4:
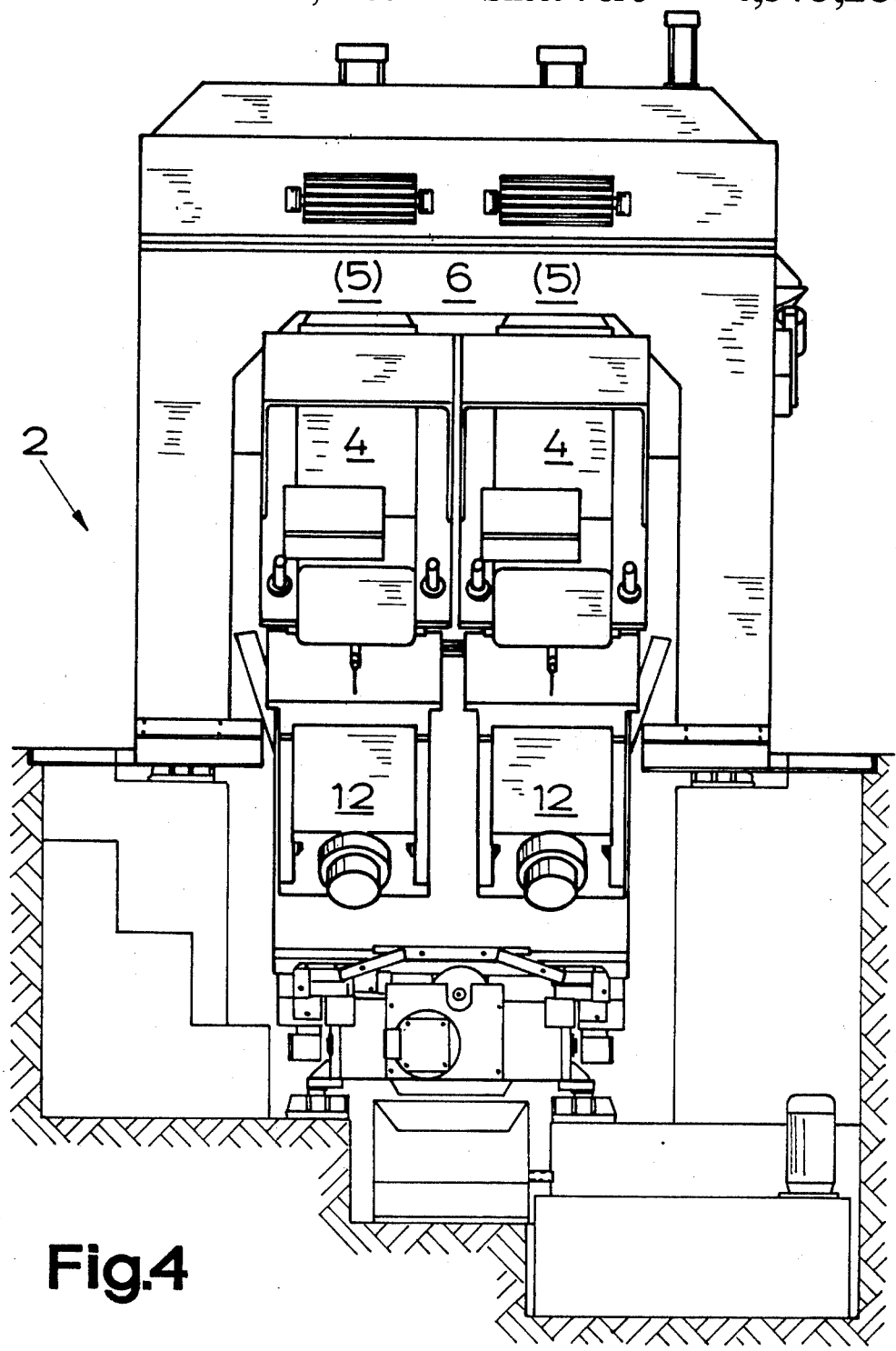
FIG. 4 is a side view of the drilling unit of the apparatus of FIG. 1.

As seen in FIGS. 1 and 2 the angle-iron working apparatus 1 of this invention has two working stations 2 and 3 at the first of which the workpieces 15 are drilled and at the second of which they are cut. Station 3 is a hydraulic shear as shown in FIG. 3.

The drilling assembly 2 has four drilling devices 4 each provided with a drilling tool 5 that can be forced up through the workpiece 15 that is held on a support 6 in a position with its two flanges forming an acute angle with the horizontal. In fact the workpiece 15 is positioned so that its two flanges, which extend at 90° to each other, project upwardly at an angle of 45° to the horizontal and vertical, so that the drill bit of the drilling unit 5 must pass through it at an angle in turn of 45° to the horizontal and vertical.

The drilling units 4 are displaceable in a direction d both perpendicular to the flanges they must drill, for pushing their respective drill bits through them, and in a direction D transversely of these flanges and the longitudinal direction L of the workpiece 15 so that the location where the hole is to be drilled can be accurately sited.

Figure 5:
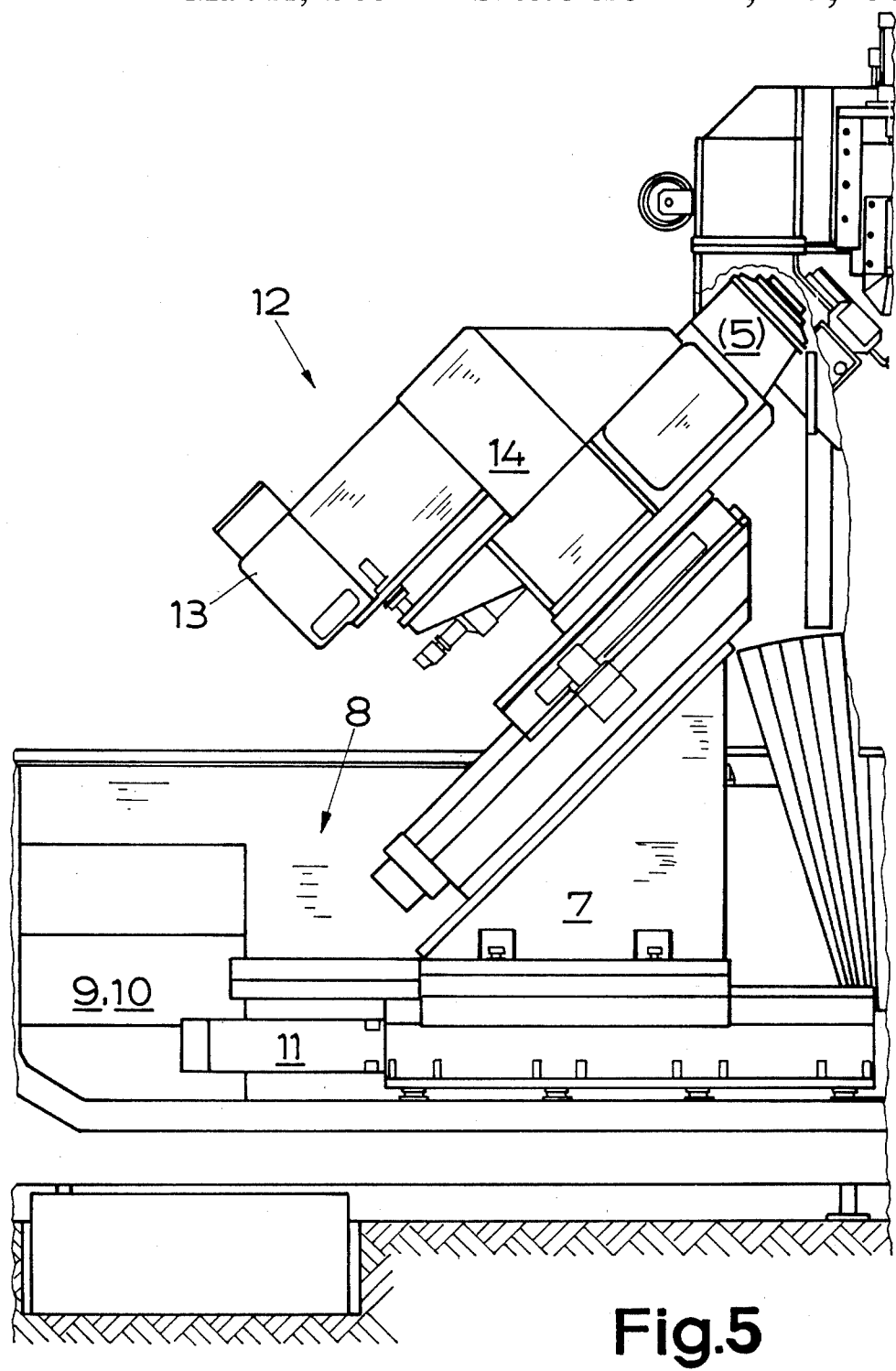
FIG. 5 is an end view of a detail of the drilling unit of FIG. 4.

According to this invention the drilling units 4 are displaced horizontally in the direction D perpendicular to the workpiece 15 and, therefore, at an angle of 45° to the flange being drilled in order to position the drill tools 5 accurately. To this end each drilling unit 4 is supported on a carriage 7 that is displaceable horizontally in the direction D. Each such carriage has a drive 8 (FIG. 5) comprising a motor 9 and transmission 10 that act on a spindle 11 for such displacement of the carriage 7 and of the drilling unit 4 carried thereon.

According to this invention a controller 16 operates the motor 9 to displace the carriage 7 and unit 4 through a distance in the direction D equal to the secant or the reciprocal of the cosine of the angle the flange lies at to the direction D times the desired displacement in the direction d. In this case a displacement through a distance x in the direction d, with a flange angle of 45°, is effected by a displacement in the direction D through a distance of x/cos 45°. Of course the controller 16 must also take into account the ratio between rotation of the motor 9 and displacement in the direction D.

The drilling tool 5 itself is displaced on the carriage 7 in the direction d by a drive 12 comprised of a motor and a transmission 14. Such displacement is only effected once the drilling tool 5 has been properly positioned in the direction D for the desired spacing between the hole being drilled and the edge of the angle iron 15.

Not only does the system of this invention ensure accurate position of the drilling unit 5 for perfect positioning of the holes it makes transversely of the workpiece and of its transport direction L through the apparatus 1, but it also prevents the workpiece 15 itself from becoming malpositioned relative to the unit 4 due to the latter's horizontal movement. Thue the unit 4 has in addition to the desired component in a plane parallel to the plane of the flange being drilled a component perpendicular thereto in the unneeded plane. In the illustrated embodiment, in which the unit 4 moves perpendicular to the flange of the workpiece that is to be worked and perpendicular to the workpiece transport direction, the above-given problem is eliminated since the unit 4 simultaneously is moved in the horizontal and perpendicular to the flange of the workpiece and since during such setting the spacing between tool tip and workpiece does not change. In particular in the illustrated embodiment the unit 4 is moved during such predrilling positioning horizontally perpendicular to the flange to be drilled through a corrective amount equal to the center-to-edge distance of the hole times the tangent of the angle between the flange being worked and the horizontal or equal to the center-to-edge distance in the horizontal multiplied by the sine of the angle between the flange being worked and the horizontal.

As a result the drill can automatically assume the perfect position for any desired hole position. This positioning can be done automatically. Since the bulk of the machinery moves only horizontally, imbalancing problems are wholly eliminated.

We claim:

1. An apparatus for working a elonated angle-iron workpiece having a pair of nonparallel flanges at least one of which is to be drilled, the apparatus comprising:
   transport means for displacing the workpiece longitudinally through a working station;
   means in the station including a support for holding the workpiece with the one flange forming an acute angle with the horizontal;
   drilling means including a drilling tool;
   first support means for displacing the drilling means and tool horizontally in the station transverse to the workpiece; and
   second support means for displacing the drilling tool transverse to the workpiece and at the acute angle to the horizontal perpendicularly through the one flange.

2. The drilling apparatus defined in claim 1 wherein the first support means includes a horizontally displaceable carriage.

3. The drilling apparatus defined in claim 1 wherein the first support means includes a first drive comprising
   a horizontal spindle operatively engaged with the carriage; and
   a motor connected to the spindle.

4. The drilling apparatus defined in claim 3 wherein the drive includes a controller for displacing the carriage horizontally, in order to move the drilling tool along the one flange through a predetermined distance, a horizontal distance equal to the predetermined distance multiplied by the reciprocal of the cosine of the acute angle the one flange forms with the horizontal.

5. The drilling apparatus defined in claim 4 wherein the first support means includes second drive means for displacing the drilling tool perpendicularly to the one flange during displacement of the carriage through the horizontal distance in such manner that the drilling tool does not change spacing from the one flange during horizontal displacement of the carriage.

6. The drilling apparatus defined in claim 4 wherein the first support means includes second drive means for displacing the drilling tool perpendicularly of the one flange during displacement of the carriage through the horizontal distance through a distance equal to the predetermined distance multiplied by the tangent of the acute angle the one flange forms with the horizontal, whereby the drilling tool does not change spacing from the one flange during horizontal adjustment.

7. The drilling apparatus defined in claim 6 wherein the second drive means includes a second carriage carrying the drilling tool and a second drive motor operatively connected thereto.

8. The drilling apparatus defined in claim 6 wherein the second drive means in independent of the first drive.

9. The drilling apparatus defined in claim 6 wherein the second drive means and first drive are interconnected.

10. A method of drilling an elonated angle-iron workpiece having a pair of nonparallel flanges at least one of which is to be drilled, the method comprising the steps of:

holding the workpiece with the one flange forming an acute angle with the horizontal in a working station;

displacing a drilling tool horizontally in the station transverse to the workpiece until the tool is aligned with the location on the flange to be drilled, the drilling tool being inclined to the horizontal to extend perpendicularly of the one flange; and displacing the drilling tool perpendicularly of the workpiece through the one flange.

11. The method defined in claim 10 wherein, in order to move the drilling tool along the one flange through a predetermined distance, the tool is displaced through a horizontal distance equal to the predetermined distance multiplied by the reciprocal of the cosine of the acute angle the one flange forms with the horizontal.

12. The method defined in claim 11, further comprising the step of displacing the drilling tool perpendicularly of the one flange during displacement of the drilling tool through the horizontal distance in such manner that the drilling tool does not change spacing from the one flange during horizontal displacement of the carriage.

13. The method defined in claim 11, further comprising the step of displacing the drilling tool perpendicularly of the one flange during displacement of the carriage through the horizontal distance through a distance equal to the predetermined distance multiplied by the tangent of the acute angle the one flange forms with the horizontal, whereby the drilling tool does not change spacing from the one flange during horizontal adjustment.

* * * * *